United States Patent
Marumo et al.

(10) Patent No.: US 8,488,339 B2
(45) Date of Patent: Jul. 16, 2013

(54) SWITCHING POWER SUPPLY

(75) Inventors: Katsuya Marumo, Otsu (JP); Shinichi Hosomi, Kyoto (JP)

(73) Assignee: OMRON Corporation, Kyoto (JP)

( * ) Notice: Subject to any disclaimer, the term of this patent is extended or adjusted under 35 U.S.C. 154(b) by 345 days.

(21) Appl. No.: 13/033,067

(22) Filed: Feb. 23, 2011

(65) Prior Publication Data
US 2011/0222319 A1   Sep. 15, 2011

(30) Foreign Application Priority Data
Mar. 9, 2010   (JP) .................. 2010-052101

(51) Int. Cl.
H02M 3/335   (2006.01)

(52) U.S. Cl.
USPC .......... 363/21.03; 315/411; 315/387

(58) Field of Classification Search
USPC ............. 363/16–20, 21.01, 21.03, 21.07, 363/21.12, 49, 67, 131; 315/387, 399, 408, 315/411
See application file for complete search history.

(56) References Cited

U.S. PATENT DOCUMENTS

| 4,272,805 A * | 6/1981 | Iguchi et al. | 363/19 |
| 4,282,460 A * | 8/1981 | Luz et al. | 315/39.71 |
| 5,369,307 A * | 11/1994 | Kobayashi | 307/125 |
| 6,903,945 B2 * | 6/2005 | Kitano | 363/21.01 |
| 7,532,488 B2 * | 5/2009 | Tsuruya | 363/21.03 |

FOREIGN PATENT DOCUMENTS

| JP | 08-019247 | 1/1996 |
| JP | 11-356036 | 12/1999 |
| JP | 2000-308339 | 11/2000 |
| JP | 2000-350448 | 12/2000 |
| JP | 2002-112549 | 4/2002 |

OTHER PUBLICATIONS

Patent Abstract in Japanese Publication No. 2000-350448 Publication date Dec. 15, 2000 (1 page).
Patent Abstract in Japanese Publication No. 2000-308339 Publication date Nov. 2, 2000 (1 page).
Patent Abstract in Japanese Publication No. 11-356036 Publication date Dec. 24, 1999 (1 page).
Patent Abstract in Japanese Publication No. 08-019247 Publication date Jan. 19, 1996 (1 page).
Patent Abstract in Japanese Publication No. 2002-112549 Publication date Apr. 12, 2002 (1 page).

* cited by examiner

Primary Examiner — Rajnikant Patel
(74) Attorney, Agent, or Firm — Osha Liang LLP

(57) ABSTRACT

A switching power supply includes a first auxiliary power supply for causing a first auxiliary winding of a transformer to induce voltage by ON/OFF control of a switching element connected to a primary winding of the transformer. The voltage induced by the first auxiliary winding charges a capacitor in the first auxiliary power supply. The switching power supply also includes a control circuit for starting and stopping the ON/OFF control of the switching element by comparing a voltage of the capacitor with a first threshold value, an activation circuit for charging the capacitor with voltage from the power supply input to the switching power supply, and a determination unit for determining a lifespan of the switching power supply based on the voltage of the capacitor after the voltage of the capacitor becomes greater than or equal to the first threshold value.

18 Claims, 5 Drawing Sheets

SWITCHING POWER SUPPLY

BACKGROUND OF THE INVENTION

1. Technical Field

One or more embodiments of the present invention relate to a switching power supply.

2. Related Art

Japanese Unexamined Patent Publication No. 2000-350448 and Japanese Unexamined Patent Publication No. 2000-308339 disclose a switching power supply for detecting a lifespan of a smoothing capacitor based on a ripple voltage of a smoothing capacitor on a primary side or a secondary side. Japanese Unexamined Patent Publication No. 11-356036 discloses a DC (Direct Current) power supply device for predicting the lifespan of a smoothing capacitor based on the ambient temperature, the ripple current value, the lifespan characteristics data, the expected lifespan time, and the elapsed lifespan time. Japanese Unexamined Patent Publication No. 8-19247 and Japanese Unexamined Patent Publication No. 2002-112549 disclose a technique for predicting the lifespan of the switching power supply based on the ripple voltage.

Thus, various methods for predicting the lifespan of the switching power supply have been proposed. However, the method of predicting the lifespan of the switching power supply may not necessarily meet the requirement of the user. A new method for predicting the lifespan of the switching power supply is thus desired.

SUMMARY OF THE INVENTION

In accordance with an aspect of one or more embodiments of the present invention, a switching power supply according to one or more embodiments of the present invention includes a first auxiliary power supply for causing a secondary winding and a first auxiliary winding of a transformer to induce voltage by ON/OFF control of a switching element connected to a primary winding of the transformer, the voltage induced by the secondary winding being smoothened to output a DC voltage, and the voltage induced by the first auxiliary winding being smoothened to charge a capacitor in the first auxiliary power supply, where the switching power supply further includes a control circuit for starting the ON/OFF control of the switching element connected to the primary winding of the transformer when a voltage of the capacitor becomes greater than or equal to a first threshold value, causing the secondary winding of the transformer and the first auxiliary winding to induce voltage by the ON/OFF control, and stopping the ON/OFF control when the voltage of the capacitor becomes smaller than or equal to a second threshold value smaller than the first threshold value; an activation circuit for charging the capacitor with the voltage from power supply input to the switching power supply; and a determination unit for determining a lifespan of the switching power supply based on the voltage of the capacitor after the voltage of the capacitor becomes greater than or equal to the first threshold value.

In the above switching power supply, the determination unit may determine the lifespan of the switching power supply when the voltage of the capacitor after the voltage of the capacitor becomes greater than or equal to the first threshold value becomes smaller than or equal to the second threshold value.

In the above switching power supply, the determination unit may determine a timing to change the switching power supply when the voltage of the capacitor after the voltage of the capacitor becomes greater than or equal to the first threshold value becomes smaller than or equal to a third threshold value between the first threshold value and the second threshold value.

In the above switching power supply, the determination unit may include a first comparator having a first reference voltage input terminal for receiving a first reference voltage corresponding to the first threshold value, a first capacitor voltage input terminal for receiving a voltage corresponding to the voltage of the capacitor, and a first output terminal for outputting an activation signal when the voltage input to the first capacitor voltage input terminal exceeds the first reference voltage; and a second comparator, which is enabled to operate by the activation signal output from the first output terminal, having a second reference voltage input terminal for receiving a second reference voltage corresponding to the second threshold value, a second capacitor voltage input terminal for receiving a voltage corresponding to the voltage of the capacitor, and a second output terminal for outputting a signal indicating the lifespan of the switching power supply when the voltage input to the second capacitor voltage input terminal becomes lower than or equal to the second reference voltage.

In the above switching power supply, the determination unit may further include a third comparator, which is enable to operate by the activation signal output from the first output terminal, having a third reference voltage input terminal for receiving a third reference voltage corresponding to a third threshold value between the first threshold value and the second threshold value, a third capacitor voltage input terminal for receiving a voltage corresponding to the voltage of the capacitor, and a third output terminal for outputting a signal indicating the timing to change the switching power supply when the voltage input to the third capacitor voltage input terminal becomes lower than or equal to the third reference voltage.

In the above switching power supply, the determination unit may determine the lifespan of the switching power supply when a rate of change per unit time in the voltage of the capacitor after the voltage of the capacitor becomes greater than or equal to the first threshold value becomes greater than or equal to a rate of change defined in advance.

In the above switching power supply, the determination unit is activated by the voltage from the power supply input, and a second auxiliary power supply for continuing the operation of the determination unit based on the voltage induced by a second auxiliary winding of the transformer may be further arranged, where the determination unit may enable the activation circuit to operate in response to being activated based on the power from the second auxiliary power supply.

In the above switching power supply, an estimating unit for estimating a timing to change the switching power supply based on a total operation time of the switching power supply may be further arranged.

In the above switching power supply, an estimating unit for estimating the timing to change the switching power supply based on a total operation time of the switching power supply; and a notifying unit for notifying outside of the timing to change the switching power supply when the determination result of the determination unit indicates the timing to change the switching power supply and the result of estimation by the estimating unit indicates the timing to change the switching power supply may be further arranged.

In the above switching power supply, a first capacitor for smoothing current from the power supply input; and a second capacitor for smoothing current output from the secondary winding may be further arranged; where an estimated lifespan defined in advance with respect to the capacitor may be shorter than an estimated lifespan defined with respect to the first capacitor and the second capacitor.

The outline of one or more embodiments of the invention described above does not just list all the necessary characteristics of one or more embodiments of the present invention. The sub-combination of such characteristic group may also be contrived as one or more embodiments of an invention.

DETAILED DESCRIPTION

Hereinafter, embodiments of the present invention will be described with reference to the accompanied drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
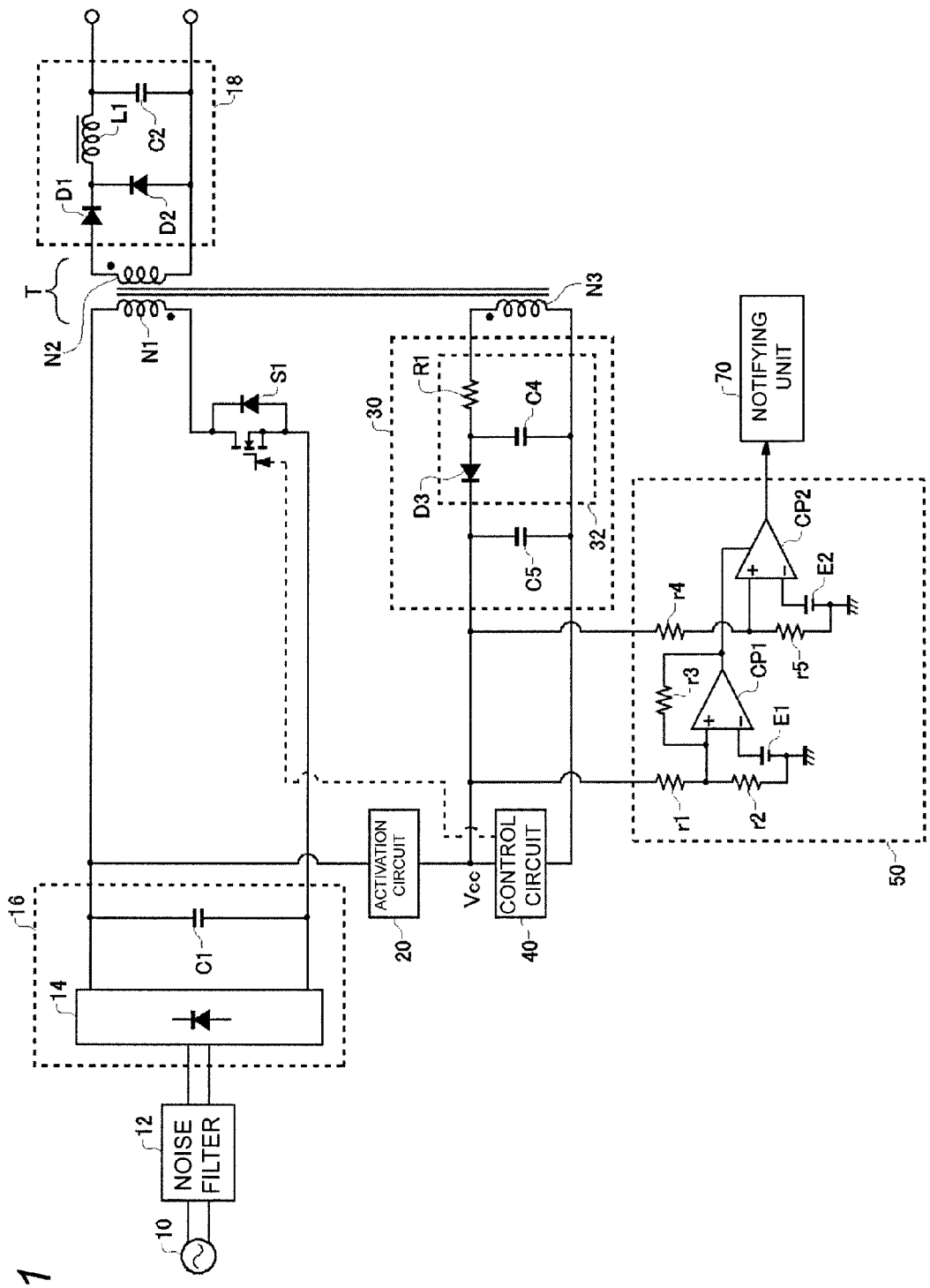
FIG. 1 is a view showing a circuit configuration of a switching power supply according to a first embodiment.

FIG. 1 shows a circuit configuration of a switching power supply according to a first embodiment. An alternating current (AC) from an AC power supply 10 is rectified and smoothened by an input side rectifier-smoothing circuit 16 through a noise filter 12, and then input to a primary winding N1 of a high frequency transformer T. A switching element S1 configured by FET and the like is connected in series to the primary winding N1. The switching element S1 is ON/OFF controlled by a control circuit 40. The current is intermittently input to the primary winding N1 by ON/OFF controlling the switching element S1, and the voltage is induced by a secondary winding N2 and an auxiliary winding N3. An activation circuit 20 supplies the power from the AC power supply 10 to the control circuit 40 through the noise filter 12 and the input side rectifier-smoothing circuit 16 before the control circuit 40 is started to activate the control circuit. A first auxiliary power supply 30 supplies power to the control circuit 40 based on the voltage induced by the auxiliary winding N3 after the control circuit 40 is started.

The switching power supply configured as above converts the AC voltage from the AC power supply 10 to a DC voltage set in advance for output by adjusting the ON/OFF period of the switching element S1.

The drawbacks of the switching power supply occurs relatively often from degradation of the capacitor arranged in the switching power supply. Thus, in the switching power supply, the lifespan of the capacitor is predicted and the timing to change the switching power supply is notified to the user. Furthermore, in the switching power supply, the remaining lifespan of the capacitor may be predicted based on the ambient temperature and the total operation time. In this case, the switching power supply predicts the remaining lifespan of the capacitor by using a function defined in advance with the ambient temperature and the total operation time as parameters. This function also differs depending on the initial capacity of the capacitor, where the function corresponding to the initial capacity of the capacitor measured at the time of shipment may be incorporated in the switching power supply in advance, and the switching power supply may use such function to predict the remaining lifespan of the capacitor. However, the actual lifespan of the capacitor tends to vary among the capacitors even if the capacitors have a common specification. Therefore, the remaining lifespan predicted based on the ambient temperature, the total operation time, and the like may not necessarily be the actual remaining lifespan of the capacitor. Moreover, as the actual lifespan varies among the capacitors, design is often made such that the timing to change is notified at the lifespan shorter than the actual lifespan of the capacitor. However, some users desire to operate the switching power supply by continuously using the capacitor until the end of the actual lifespan of the relevant capacitor.

In the first embodiment, a determination unit 50 more accurately detects the actual lifespan of the capacitor. If the actual lifespan of the capacitor is more accurately detected in the determination unit 50, the switching power supply can be operated by continuously using the capacitor until the end of the actual lifespan of the relevant capacitor. Furthermore, the determination result of the determination unit 50 is notified to the user through a notifying unit 70. The user can then easily specify that the cause of drawback of the switching power supply is the degradation of the capacitor.

The lifespan of the capacitor also differs depending on the configuring material of the electrolyte solution, the electrode, and the like. That is, the lifespan of the capacitor differs by the specification of the capacitor. In particular, the lifespan generally becomes shorter as the electrolytic capacitor becomes smaller in size. The lifespan also differs depending on external factors such as the ambient temperature, the usage voltage, the ripple current flowed, and the like. When predicting the remaining lifespan of the capacitor, the remaining lifespan of the capacitor having the shortest lifespan is generally predicted among the plurality of capacitors of the switching power supply in view of the specification of the capacitor and the external factors. A capacitor C5 of the first auxiliary power supply 30 in the plurality of capacitors of the switching power supply is small and has a relatively short lifespan compared to the other capacitors. In the first embodiment, the capacitor having a specification of shortest lifespan is used as the capacitor C5 of the first auxiliary power supply, where the determination unit 50 determines the lifespan of the capacitor C5, and the notifying unit 70 notifies the timing to change the capacitor C5 or the abnormality of the capacitor C5.

In FIG. 1, the noise filter 12 removes noise generated in the switching element S1, and the like. The noise filter 12 is connected to a rectifier circuit 14 configured by a diode bridge. Furthermore, a smoothing capacitor C1 is connected between a pair of output lines of the rectifier circuit 14. The rectifier circuit 14 and the smoothing capacitor C1 configure the input side rectifier-smoothing circuit 16.

The switching element S1 configured by the FET and the like is connected between the output ends of the smoothing capacitor C1 through the primary winding N1 of the high frequency transformer T1. The switching element S1 is ON/OFF controlled based on a switching control signal from the control circuit 40. An output side rectifier-smoothing circuit 18 is connected to a secondary winding N2 of the high frequency transformer T. The output side rectifier-smoothing circuit 18 is configured by diodes D1, D2, a reactor L1, and a smoothing capacitor C2. An anode terminal of the diode D1 is connected to one end of the secondary winding N2, and a cathode terminal of the diode D1 is connected to a cathode terminal of the diode D2 and one end of the reactor L1. The other end of the reactor L1 is connected to one end of the smoothing capacitor C2, and the other end of the smoothing capacitor C2 is connected to an anode terminal of the diode D2 and the other end of the secondary winding. A load (not shown) is connected to both ends of the smoothing capacitor C2.

The first auxiliary power supply 30 is connected to both ends of an auxiliary winding N3 of the high frequency transformer T. The first auxiliary power supply 30 is configured by an auxiliary side rectifier-smoothing circuit 32 and a capacitor C5. The capacitor C5 is connected in parallel to the auxiliary side rectifier-smoothing circuit 32. The auxiliary side rectifier-smoothing circuit 32 is configured by a resistor R1, a smoothing capacitor C4, and a diode D3. One end of the resistor R1 is connected to one end of the auxiliary winding N3, and one end of the smoothing capacitor C4 is connected to the other end of the auxiliary winding N3. The anode terminal of the diode D3 and the other end of the smoothing capacitor C4 are connected to the other end of the resistor R1. Furthermore, one end of the capacitor C5 is connected to the cathode terminal of the diode D3, and the other end of the smoothing capacitor C4 and the other end of the auxiliary winding N3 are connected to the other end of the capacitor C5. According to such configuration, the voltage induced by the auxiliary winding N3 is rectified and smoothened by the auxiliary side rectifier-smoothing circuit 32 and applied to the capacitor C5 thereby charging the capacitor C5. The first auxiliary power supply 30 supplies the power charged in the capacitor C5 to the control circuit 40.

The activation circuit 20 is connected to one end of the input side rectifier-smoothing circuit 16. The activation circuit 20 charges the capacitor C5 arranged in the first auxiliary power supply 30 with the voltage from the AC power supply 10 input through the noise filter 12 and the input side rectifier-smoothing circuit 16 in accordance with the turning ON of the activation switch (not shown) arranged in the switching power supply. The control circuit 40 is activated when the voltage Vcc charged in the capacitor C5 becomes greater than or equal to a first threshold value defined in advance.

After the activation, the control circuit 40 starts the ON/OFF control of the switching element S1, and the current from the AC power supply 10 is intermittently applied to the primary winding N1. When the current is intermittently applied to the primary winding N1, the voltage is induced by the secondary winding N2 and the auxiliary winding N3. Thus, the capacitor C5 is charged based on the voltage induced by the auxiliary winding N3 after the activation, and the voltage charged in the capacitor C5 is stably supplied to the control circuit 40.

Figure 2:
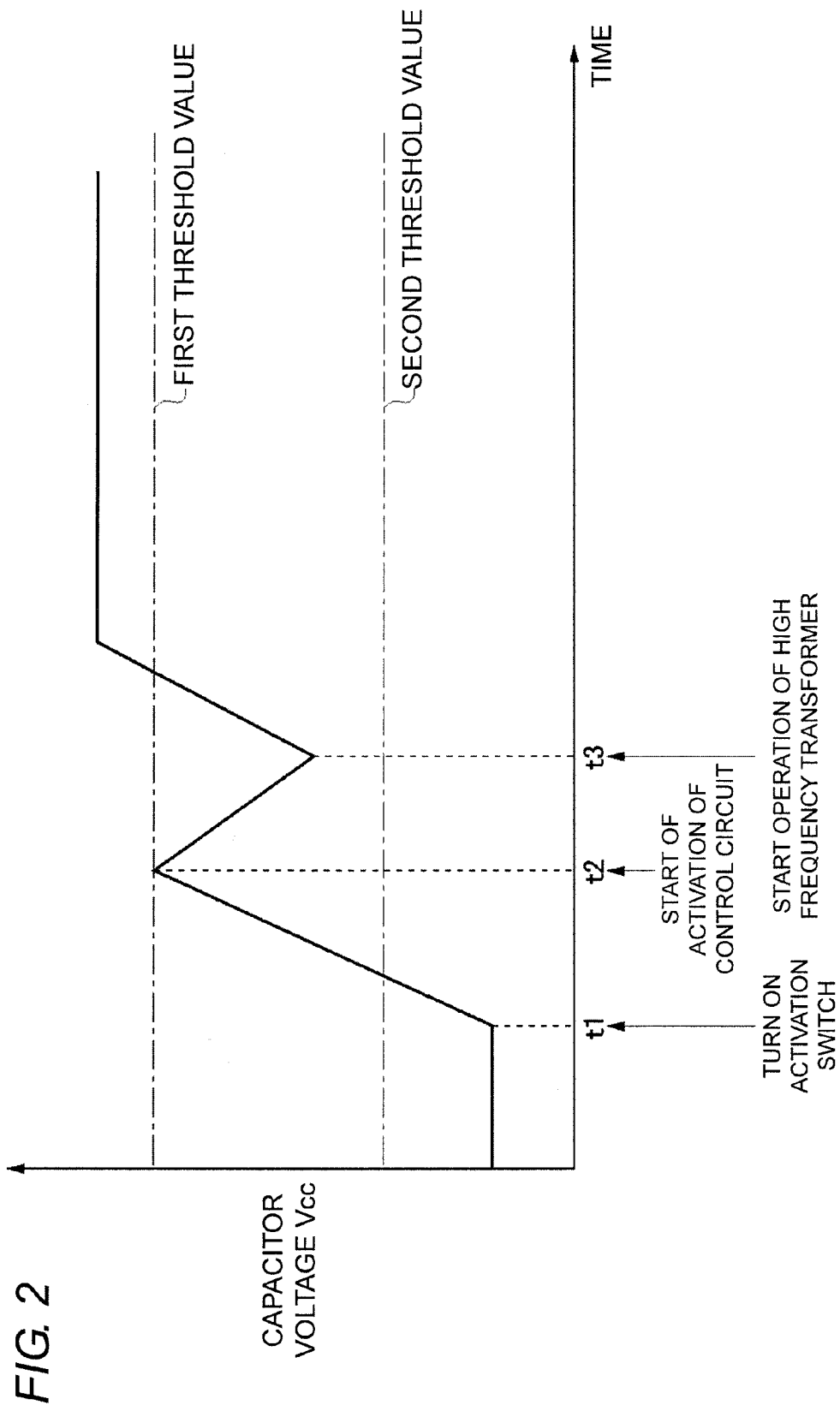
FIG. 2 is a view showing one example of a voltage waveform of a normal capacitor C5 according to one or more embodiments of the present disclosure.

FIG. 2 shows one example of a voltage waveform of the capacitor C5 when the switching power supply, in which the capacitor C5 is normal, starts the operation. When the activation switch is turned ON at time t1, the charging of the capacitor C5 starts. When the voltage Vcc of the capacitor C5 becomes greater than or equal to a first threshold value Vt1 at time t2, the control circuit 40 starts the activation. The voltage Vcc of the capacitor C5 lowers while the control circuit 40 is activated and ON/OFF controls the switching element S1, and the capacitor C5 is charged by the voltage induced by the auxiliary winding N3, that is, until t3. The voltage Vcc of the capacitor C5 lowers because an operation current of the control circuit 40 increases when the control circuit 40 is once activated at time t2 but the current corresponding to the increased current amount is not supplied from the activation circuit 20, and hence the current is temporarily supplied from the capacitor C5 to the control circuit 40 until the charging of the capacitor C5 subsequently starts by the voltage induced by the auxiliary winding N3 at time t3. The voltage Vcc of the capacitor C5 thereafter stably shifts by the voltage induced by the auxiliary winding N3. Thus, when the capacitor C5 is normal, a stable power can be supplied to the control circuit 40 because the voltage Vcc of the capacitor C5 is stable. The second threshold value Vt2 indicates the voltage value at which the control circuit 40 stops.

Figure 3:
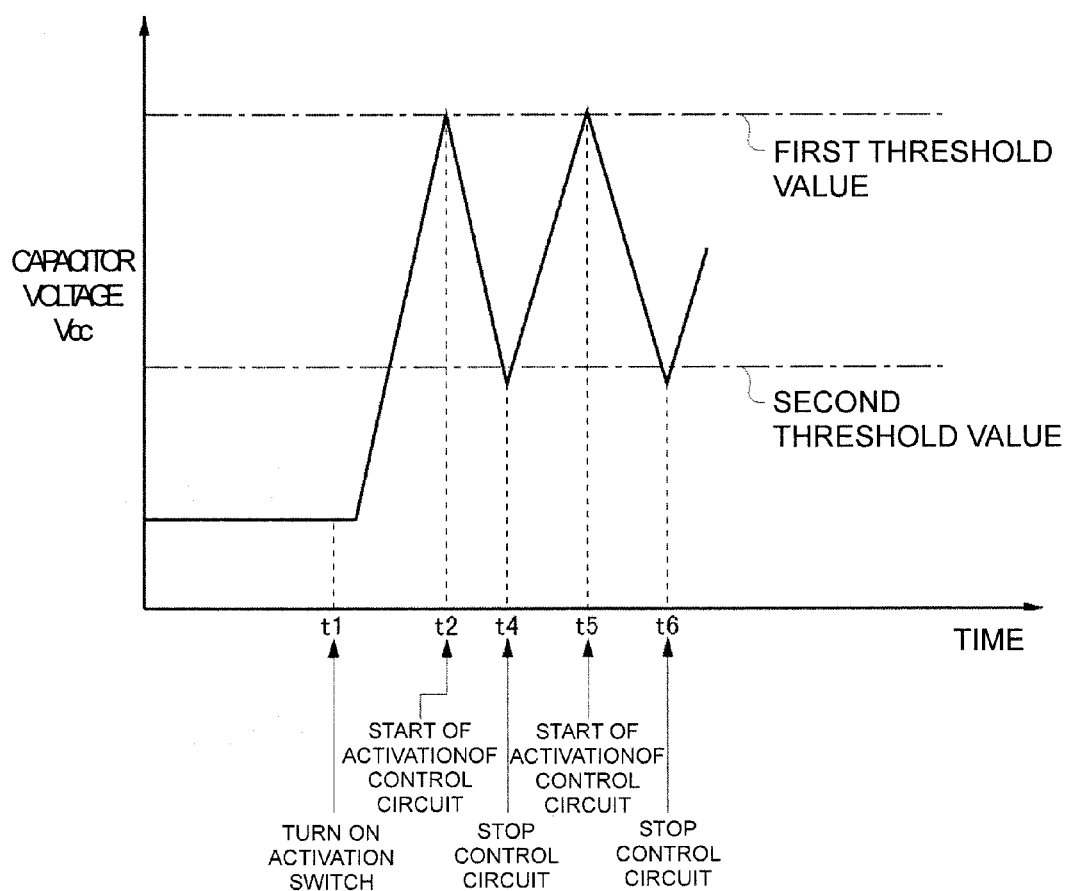
FIG. 3 is a view showing one example of a voltage waveform of a degraded capacitor C5 according to one or more embodiments of the present disclosure.

FIG. 3 shows one example of a voltage waveform of the capacitor C5 when the switching power supply, in which the capacitor C5 is degraded, starts the operation.

When the activation switch is turned ON at time t1, the charging of the capacitor C5 starts. When the voltage Vcc of the capacitor C5 becomes greater than or equal to a first threshold value Vt1 at time t2, the control circuit 40 starts the activation. The voltage Vcc of the capacitor C5 lowers while the control circuit 40 is activated and ON/OFF controls the switching element S1, and the capacitor C5 is charged by the voltage induced by the auxiliary winding N3. If the degradation of the capacitor C5 is advancing, the voltage drop rate per unit time of the capacitor C5 becomes higher than the voltage drop rate of the normal capacitor C5. That is, the voltage drop of the capacitor C5 becomes steep. Therefore, the voltage Vcc of the capacitor C5 becomes lower than a second threshold value Vt2 at time t4 and the control circuit 40 stops before the charging of the capacitor C5 by the voltage induced by the auxiliary winding N3 is started. If the control circuit 40 stops, the charging of the capacitor C5 is again started through the activation circuit 20, and the control circuit 40 is again activated at the time point the voltage Vcc of the capacitor C5 becomes greater than or equal to the first threshold value Vt1. However, similar to the above, the voltage Vcc of the capacitor C5 becomes lower than the second threshold value Vt2 at time t6 and the control circuit 40 stops before the charging of the capacitor C5 by the voltage induced by the auxiliary winding N3 is started.

Thus, if the switching power supply is activated with the capacitor C5 in the degraded state, the output will be made once from the switching power supply, but the control circuit 40 will immediately stop and the output from the switching power supply will stop.

In the first embodiment, the presence of such phenomenon is detected by the determination unit 50 to detect the lifespan of the switching power supply.

The determination unit 50 determines the lifespan of the switching power supply due to abnormality of the capacitor C5 when the voltage Vcc of the capacitor C5, after the voltage Vcc of the capacitor C5 becomes greater than or equal to the first threshold value Vt1, becomes lower than or equal to the second threshold value Vt2. The voltage Vcc of the capacitor C5 is sometimes lower than or equal to the second threshold value Vt2 before the activation of the control circuit 40. Therefore, if the determination unit 50 detects the voltage Vcc of the capacitor C5 at an arbitrary timing and determines abnormality of the capacitor C5 when such voltage is lower than or equal to the second threshold value Vt1, determination may be wrongly made as the abnormality of the capacitor C5.

Thus, in the first embodiment, the determination unit 50 detects that the voltage Vcc of the capacitor C5 is greater than or equal to the first threshold value Vt1, and determines the lifespan of the switching power supply due to abnormality of the capacitor C5 when the voltage Vcc of the capacitor C5 after the detection is lower than or equal to the second threshold value Vt2.

To carry out the above determination, the determination unit 50 includes a comparator CP1 and a comparator CP2.

The non-inverted terminal of the comparator CP1 is connected to one end of the capacitor C5 through the resistor r1, and also grounded through the resistor r2. The inverted terminal of the comparator CP1 is connected with a first reference voltage source E1. The output terminal of the comparator CP1 is connected to a power supply connection terminal of the comparator CP2. The non-inverted terminal and the output terminal of the comparator CP1 are connected through a resistor r3 to provide hysteresis in the comparator CP1. The resistance values of the resistor r1 and the resistor r2 are set in advance so that the activation signal is output from the comparator CP1 when the voltage Vcc of the capacitor C5 becomes greater than or equal to the first threshold value Vt1.

With the comparator CP1 configured as above, the activation signal is output from the comparator CP1 when the voltage Vcc of the capacitor C5 becomes greater than or equal to the first threshold value Vt1. Furthermore, the activation signal is continuously output from the comparator CP1 even after the voltage Vcc of the capacitor C5 becomes lower than or equal to the first threshold value Vt1 because the hysteresis is provided.

The non-inverted terminal of the comparator CP2 is connected to one end of the capacitor C5 through the resistor r4, and also grounded through the resistor r5. The inverted terminal of the comparator CP2 is connected with a second reference voltage source E2. The resistance values of the resistor r4 and the resistor r5 are set in advance so that the output signal is output from the comparator CP2 when the voltage Vcc of the capacitor C5 becomes greater than or equal to the second threshold value Vt2.

With the comparator CP2 configured as above, the comparator CP2 is activated when the voltage of the capacitor C1 becomes greater than or equal to the first threshold value. After the activation, the comparator CP2 continuously outputs the output signal if the voltage Vcc of the capacitor C5 is greater than the second threshold value. The comparator CP2 does not output the output signal if the voltage Vcc of the capacitor C5 is lower than or equal to the second threshold value.

Therefore, the comparator CP1 outputs the activation signal when the voltage Vcc of the capacitor C5 becomes greater than or equal to the first threshold value Vt1 by configuring the determination unit 50 as above. The comparator CP2 is activated by the activation signal output from the comparator CP1, and outputs the output signal until the voltage Vcc of the capacitor C5 becomes lower than or equal to the second threshold value Vt2, and stops the output of the output signal when the voltage Vcc of the capacitor C5 becomes lower than or equal to the second threshold value Vt2. That is, the lifespan of the switching power supply is determined due to the abnormality of the capacitor C5 when the output of the output signal from the comparator CP2 is stopped.

The notifying unit 70 notifies the lifespan of the switching power supply to the user by displaying the information indicating it is the lifespan of the switching power supply on the display unit when the determination unit 50 determines the lifespan of the switching power supply due to the abnormality of the capacitor C5. The notifying unit 70 may notify the user of the abnormality of the capacitor C5 when the determination unit 50 determines the abnormality of the capacitor C5.

Figure 4:
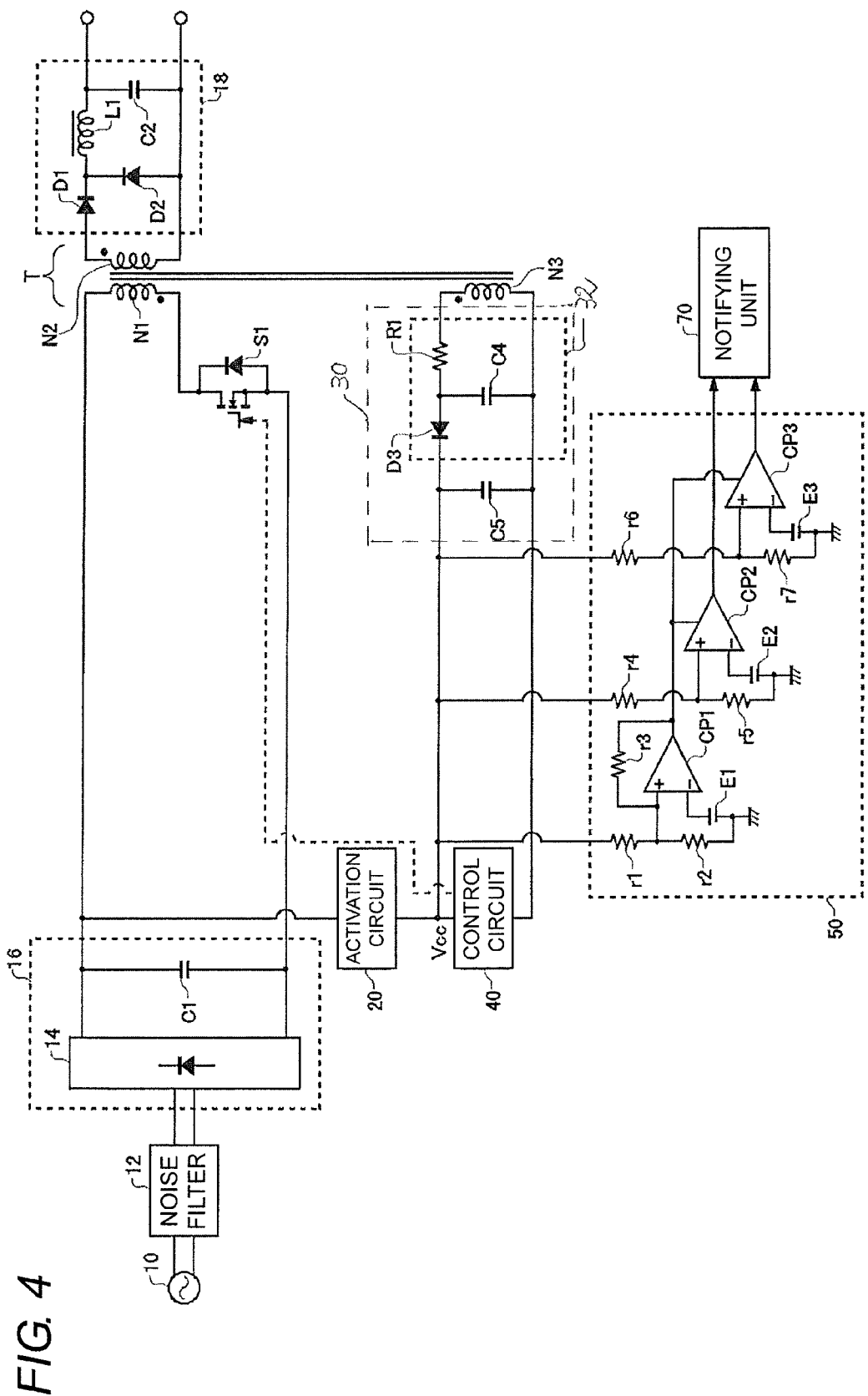
FIG. 4 is a view showing a circuit configuration of a switching power supply according to a second embodiment.

FIG. 4 shows a circuit configuration of a switching power supply according to a second embodiment. The switching power supply according to the second embodiment differs from the switching power supply according to the first embodiment in that the determination unit 50 determines the timing to change the switching power supply when the voltage Vcc of the capacitor C5 becomes lower than or equal to a third threshold value between the first threshold value and the second threshold value.

As described above, the second threshold value Vt2 indicates the voltage at which the control circuit 40 stops. That is, the switching power supply is not activated normally if the voltage Vcc of the capacitor C5 is lower than or equal to the second threshold value Vt2. The use may desire to prevent in advance the switching power supply from not being activated normally. Thus, in the second embodiment, the determination unit 50 determines the timing to change the switching power supply when the voltage Vcc of the capacitor C5 becomes lower than or equal to the third threshold value, and the notifying unit 70 notifies the timing to change the switching power supply, so that the switching power supply can be prevented in advance from not being activated normally.

The determination unit 50 according to the second embodiment includes a comparator CP3 in addition to the comparators CP1, CP2 for the determination unit 50 to determine whether or not the timing to change the switching power supply.

The activation signal output from the output terminal of the comparator CP1 is input to the power supply connection terminal of the comparator CP3. Furthermore, the non-inverted terminal of the comparator CP3 is connected to one end of the capacitor C5 through the resistor r6, and also grounded through the resistor r7. The inverted terminal of the comparator CP3 is connected with a third reference voltage source E3. The resistance values of the resistor r6 and the resistor r7 are set so that the output signal is output from the comparator CP3 when the voltage Vcc of the capacitor C5 becomes greater than or equal to the third threshold value Vt3.

With such configuration, the comparator CP3 is activated based on the activation signal output from the comparator CP1 when the voltage Vcc of the capacitor C5 becomes greater than or equal to the first threshold value Vt1. After the activation, the comparator CP3 outputs the output signal until the voltage Vcc of the capacitor C5 becomes smaller than or equal to the third threshold value Vt3, and stops the output of the output signal when the voltage Vcc of the capacitor C5 becomes lower than or equal to the third threshold value Vt3. That is, the timing to change the switching power supply is determined when the output of the output signal from the comparator CP3 is stopped.

The notifying unit 70 displays information indicating the timing to change the switching power supply on the display unit when the determination unit 50 determines the timing to change the switching power supply.

Figure 5:
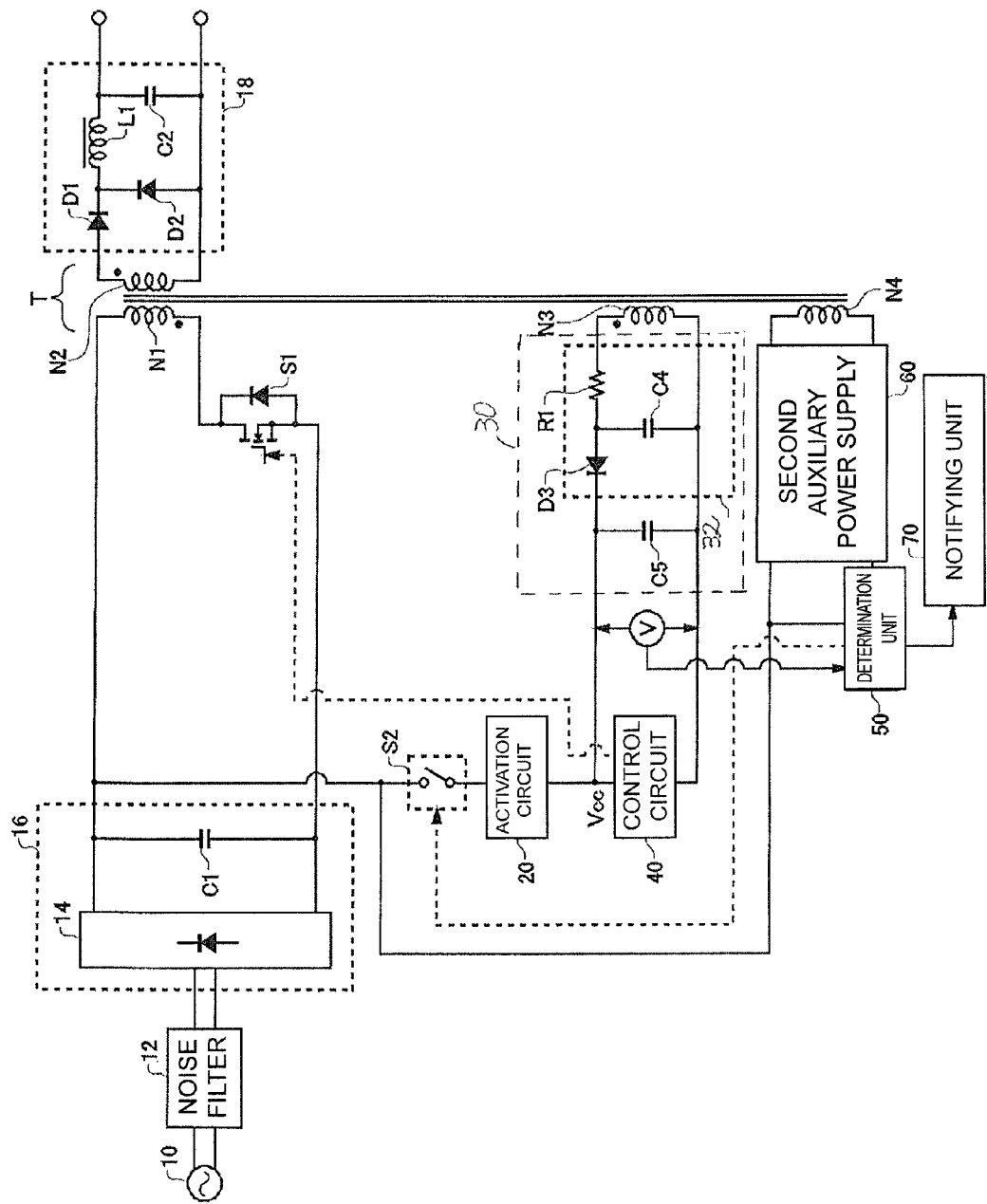
FIG. 5 is a view showing a circuit configuration of a switching power supply according to a third embodiment.

FIG. 5 shows a circuit configuration of the switching power supply according to a third embodiment. The switching power supply according to the third embodiment differs from the switching power supplies of the first and second embodiments in that the determination unit 50 determines whether or not the lifespan of the switching power supply due to abnormality of the capacitor C5 based on the rate of change per unit time of the voltage Vcc of the capacitor C5.

As described above, the voltage drop rate per unit time of the capacitor C5 becomes higher than the voltage drop rate of the normal capacitor C5 if the degradation of the capacitor C5 is advancing. Thus, in the third embodiment, the determination unit 50 determines the lifespan of the switching power supply due to the abnormality of the capacitor C5 when the rate of change per unit time of the voltage Vcc of the capacitor C5 becomes greater than or equal to the rate of change defined in advance.

In the third embodiment, the determination unit 50 may be configured by a micro-computer, and operates when receiving power supply from a second auxiliary power supply 60. A switch S2 is arranged on the input side of the activation circuit 20. The switch S2 is ON/OFF controlled based on the switch control signal of the determination unit 50. When the switch S2 is turned ON, the power from the AC power supply 10 is supplied to the activation circuit 20, and the charging of the first auxiliary power supply 30 to the capacitor C5 is started by the activation circuit 20.

The second auxiliary power supply 60 includes a capacitor. The second auxiliary power supply 60 is connected to one end of the input side rectifier-smoothing circuit 16. When the activation switch is turned ON, the second auxiliary power supply 60 is supplied with power from the AC power supply 10. The determination unit 50 is activated when the voltage of the capacitor becomes greater than or equal to a threshold value defined in advance. After the activation is completed, the determination unit 50 turns ON the switch S2 and is activated the activation circuit 20. When the activation circuit 20 is activated, the power of the control circuit 40 is supplied, and the ON/OFF control of the switching element S1 is started. The second auxiliary power supply 60 is also connected to the second auxiliary winding N4 of the high frequency transformer T, and the charging of the capacitor is continuously carried out by the voltage induced by the second auxiliary winding N4 by the ON/OFF control of the switching element S1. The power is thereby continuously supplied from the second auxiliary power supply 60 to the determination unit 50.

When being activated on receiving power supply from the second auxiliary power supply 60, the determination unit 50 turns ON the switch S2 and sequentially acquires the voltage value of the capacitor C5 through the voltage sensor V. When detecting that the voltage Vcc of the capacitor C5 is greater than or equal to the first threshold value Vt1, the determination unit 50 calculates the rate of change of the voltage Vcc of the capacitor C5 based on a plurality of voltage values acquired after the voltage Vcc of the capacitor C5 becomes greater than or equal to the first threshold value Vt1. For instance, the determination unit 50 acquires a voltage value V1 of the capacitor C5 at a time T1 and a voltage value V2 of the capacitor C5 at a time T2 after the voltage Vcc of the capacitor C5 becomes greater than or equal to the first threshold value Vt1 through the voltage sensor V. The determination unit 50 then calculates the rate of change per unit time by calculating |V2−V1|/|T2−T1|. The determination unit 50 also determines whether the calculated rate of change is greater than or equal to the rate of change defined in advance. The determination unit 50 determines the lifespan of the switching power supply due to abnormality of the capacitor C5 when the calculated rate of change is greater than or equal to the rate of change defined in advance.

As described above, the determination unit 50 may make the determination on the lifespan of the switching power supply based on the rate of change per unit time of the voltage Vcc of the capacitor C5.

In each embodiment described above, an example in which the notifying unit 70 notifies the abnormality of the switching power supply due to abnormality of the capacitor C5 determined based on the voltage Vcc of the capacitor C5 or the timing to change the switching power supply has been described.

However, in addition to notifying that it is the timing to change the switching power supply determined based on the voltage Vcc of the capacitor C5, the notifying unit 70 may notify that it is the timing to change the switching power supply even when the remaining lifespan of the capacitor C5 estimated based on the total operation time of the switching power supply and the ambient temperature becomes smaller than or equal to the referenced remaining lifespan defined in advance. Therefore, if the timing to change the switching power supply is detected or predicted based on different parameters, the user can be prevented from not being notified although it is the timing to change the switching power supply due to degradation of the capacitor C5. The user can determine the timing to change the switching power supply in view of the determination result based on the voltage Vcc of the capacitor C5, and the estimation result based on the total operation time and the ambient temperature. Thus, greater number of indices for the user to determine the timing to change the switching power supply can be provided.

In this case, the switching power supply includes an estimating unit for estimating the remaining lifespan of the capacitor C5 based on the total operation time and the ambient temperature. The estimating unit may be configured by a micro-computer that operates based on the well known program for estimating the remaining lifespan of the capacitor C5 based on the total operation time and the ambient temperature. The estimating unit may estimate the remaining lifespan of the capacitor C5 based only on the total operation time.

The notifying unit 70 may notify the user that it is the timing to change the switching power supply only when the determination unit 50 determines the timing to change the switching power supply based on the voltage Vcc of the capacitor C5 and estimated by the estimating unit as the timing to change the switching power supply based on the total operation time and the ambient temperature.

As described above, because the timing to change the switching power supply due to degradation of the capacitor C5 estimated based on the total operation time and the ambient temperature is a prediction, error may occur in the predicted timing to change. Therefore, if the switching power supply is changed based on the timing to change estimated based on the total operation time and the ambient temperature, the switching power supply may be changed even if the lifespan of the capacitor C5 is still remaining and the switching power supply can be continuously used. The switching power supply that can still be used ongoing can be suppressed from being carelessly changed by notifying the user of the timing to change the switching power supply only when the determination result of the determination unit 50 and the estimation result of the estimating unit both indicate the timing to change the switching power supply.

Furthermore, the user is not notified of the timing to change the switching power supply when the estimation result of the estimating unit indicates that it is not the timing to change the switching power supply even if the determination of the determination unit 50 has an error. In this case as well, the switching power supply that can still be used ongoing can be suppressed from being carelessly changed.

One or more embodiments of the present invention have been described, but the technical scope of the present invention is not limited to the scope defined in the embodiments described above. It should be apparent to those skilled in the art that various modifications and improvements can be made on the embodiments described above.

It should be recognized that the execution order of each process such as the operation, the procedure, the step, and the stage in the device, the system, the program and the method described in the Claims, the Specifications, and the Drawings can be realized in an arbitrary order unless particularly stated as "before", "prior", etc. and the output of the previous process is used in the subsequent process. In the operation flow of the Claims, the Specifications, and the Drawings, the description may be made using "first", "next", and the like for the sake of convenience but this does not mean that implementation in such order is essential.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A switching power supply comprising:
    a first auxiliary power supply for causing a secondary winding;
    a first auxiliary winding of a transformer to induce voltage by ON/OFF control of a switching element connected to a primary winding of the transformer,
    wherein the voltage induced by the secondary winding is smoothened to output a DC voltage, and the voltage induced by the first auxiliary winding is smoothened to charge a capacitor in the first auxiliary power supply;
    a control circuit that starts the ON/OFF control of the switching element when a voltage of the capacitor becomes greater than or equal to a first threshold value, causing the secondary winding of the transformer and the first auxiliary winding to induce voltage by the ON/OFF control,
    wherein the control circuit stops the ON/OFF control when the voltage of the capacitor becomes smaller than or equal to a second threshold value smaller than the first threshold value;
    an activation circuit for charging the capacitor with voltage from power supply input to the switching power supply; and
    a determination unit for determining a lifespan of the switching power supply based on the voltage of the capacitor after the voltage of the capacitor becomes greater than or equal to the first threshold value.

2. The switching power supply according to claim 1, wherein the determination unit determines the lifespan of the switching power supply when the voltage of the capacitor, after the voltage of the capacitor becomes greater than or equal to the first threshold value, becomes smaller than or equal to the second threshold value.

3. The switching power supply according to claim 1, wherein the determination unit determines a timing to change the switching power supply when the voltage of the capacitor, after the voltage of the capacitor becomes greater than or equal to the first threshold value, becomes smaller than or equal to a third threshold value between the first threshold value and the second threshold value.

4. The switching power supply according to claim 2, wherein the determination unit further comprises:
    a first comparator having a first reference voltage input terminal for receiving a first reference voltage corresponding to the first threshold value;
    a first capacitor voltage input terminal for receiving a voltage corresponding to the voltage of the capacitor (C5);
    a first output terminal for outputting an activation signal when the voltage input to the first capacitor voltage input terminal exceeds the first reference voltage;
    a second comparator, which is enabled to operate by the activation signal output from the first output terminal, having a second reference voltage input terminal for receiving a second reference voltage corresponding to the second threshold value;
    a second capacitor voltage input terminal for receiving a voltage corresponding to the voltage of the capacitor; and
    a second output terminal for outputting a signal indicating the lifespan of the switching power supply when the voltage input to the second capacitor voltage input terminal becomes lower than or equal to the second reference voltage.

5. The switching power supply according to claim 4, wherein the determination unit further comprises:
    a third comparator enabled to operate by the activation signal output from the first output terminal,
    wherein the third comparator comprises:
        a third reference voltage input terminal for receiving a third reference voltage corresponding to a third threshold value between the first threshold value and the second threshold value;
        a third capacitor voltage input terminal for receiving a voltage corresponding to the voltage of the capacitor; and
        a third output terminal for outputting a signal indicating the timing to change the switching power supply when the voltage input to the third capacitor voltage input terminal becomes lower than or equal to the third reference voltage.

6. The switching power supply according to claim 1, wherein the determination unit determines the lifespan of the switching power supply when a rate of change per unit time in the voltage of the capacitor, after the voltage of the capacitor becomes greater than or equal to the first threshold value, becomes greater than or equal to a rate of change defined in advance.

7. The switching power supply according to claim 6, wherein the determination unit is activated by the voltage from the power supply input,
    the switching power supply further comprising:
    a second auxiliary power supply for continuing the operation of the determination unit based on the voltage induced by a second auxiliary winding of the transformer,
    wherein the determination unit enables the activation circuit to operate in response to being activated based on the power from the second auxiliary power supply.

8. The switching power supply according to claim 1, further comprising:
    an estimating unit for estimating a timing to change the switching power supply based on a total operation time of the switching power supply.

9. The switching power supply according to claim 3, further comprising:
    an estimating unit for estimating the timing to change the switching power supply based on a total operation time of the switching power supply; and
    a notifying unit for notifying outside of the timing to change the switching power supply when the determination result of the determination unit indicates the timing to change the switching power supply and when the result of estimation by the estimating unit indicates the timing to change the switching power supply.

10. The switching power supply according to claim 1, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

11. The switching power supply according to claim 2, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

12. The switching power supply according to claim 3, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

13. The switching power supply according to claim 4, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

14. The switching power supply according to claim 5, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

15. The switching power supply according to claim 6, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

16. The switching power supply according to claim 7, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

17. The switching power supply according to claim 8, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

18. The switching power supply according to claim 9, further comprising:
   a first capacitor for smoothing current from the power supply input; and
   a second capacitor for smoothing current output from the secondary winding,
   wherein an estimated lifespan defined in advance with respect to the capacitor is shorter than an estimated lifespan defined with respect to the first capacitor and the second capacitor.

* * * * *